United States Patent [19]
O'Callaghan

[11] 3,728,565
[45] Apr. 17, 1973

[54] DEVICE FOR SENSING THE DIRECTION AND SPEED OF A SHAFT

[75] Inventor: Gerald F. O'Callaghan, Kenosha, Wis.

[73] Assignee: Eaton Corporation, Cleveland, Ohio

[22] Filed: July 21, 1971

[21] Appl. No.: 164,685

[52] U.S. Cl. ................310/168, 318/618, 318/660, 340/271
[51] Int. Cl. ..................H02k 19/20, G08b 21/00
[58] Field of Search..................318/618, 660; 340/271; 310/168

[56] References Cited

UNITED STATES PATENTS 3,614,616   10/1971   Bucek et al............................340/271

Primary Examiner—L. T. Hix
Attorney—Leslie H. Blair et al.

[57] ABSTRACT

A device for sensing the direction of rotation and the speed of a shaft includes a two-phase AC generator having a rotor attachable to the shaft and rotatable therewith and first and second spaced apart stator windings. The first and second stator windings are adapted to have first and second sinusoidal voltages established thereacross respectively, in response to rotation of the rotor with the shaft. The first sinusoidal voltage is adapted to lead the second sinusoidal voltage when the shaft rotates in a first direction and the second sinusoidal voltage is adapted to lead the first sinusoidal voltage when the shaft rotates in a direction opposite the first direction. A logic circuitry is provided for determining which of the first and second sinusoidal voltages is leading the other of the first and second sinusoidal voltages to thereby determine the direction of rotation of the shaft. The magnitude of the first and second sinusoidal voltages is dependent upon the speed of rotation of the shaft and means are provided for sensing the magnitude of one of the sinusoidal voltages to provide an output signal indicative of the speed of rotation of the shaft.

19 Claims, 5 Drawing Figures

INVENTOR
GERALD F. O'CALLAGHAN
BY Teagno and Toddy
ATTORNEYS

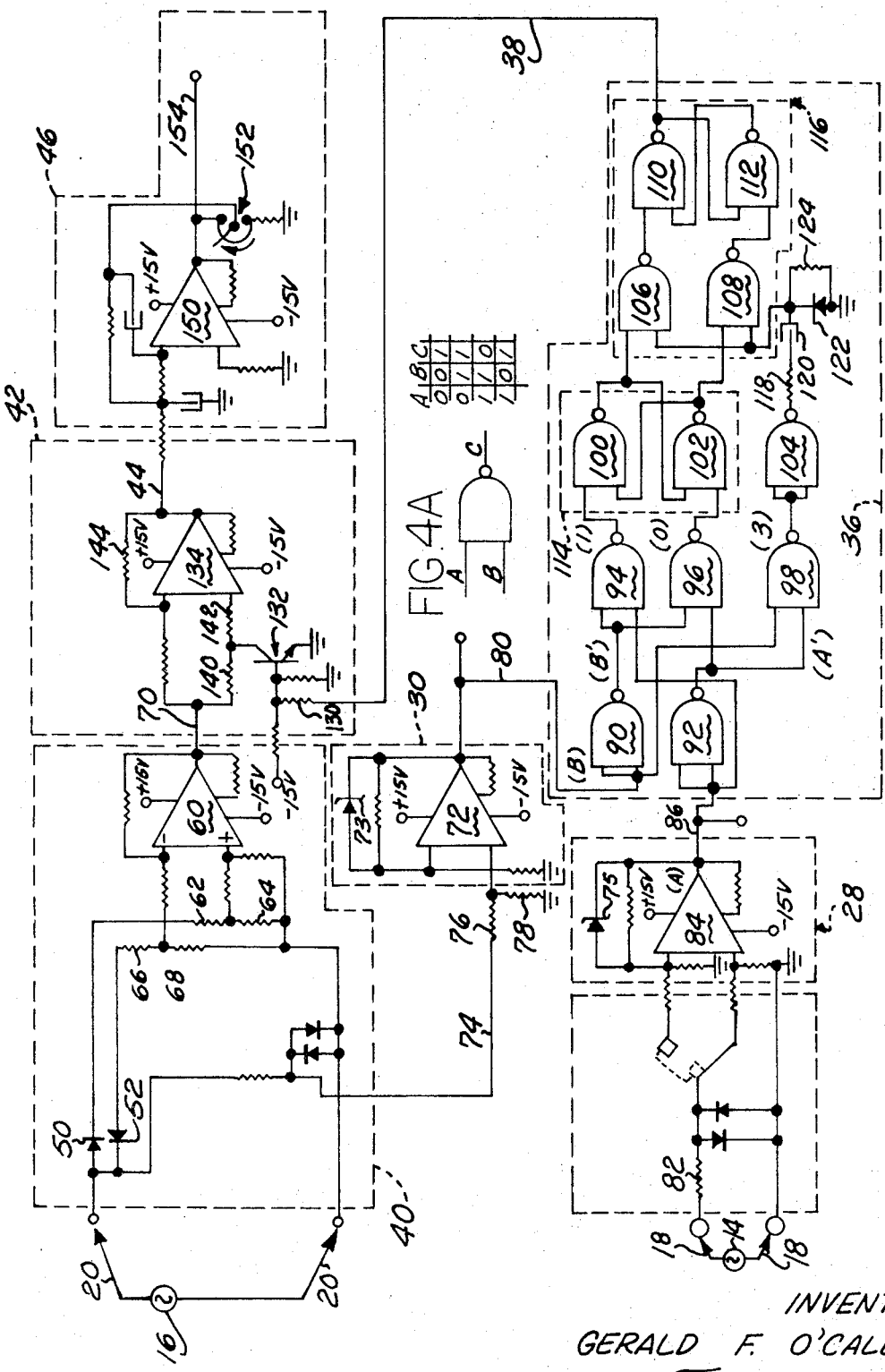

DEVICE FOR SENSING THE DIRECTION AND SPEED OF A SHAFT

The present invention relates to a device for sensing the rotational direction of a member such as a shaft and more particularly to a device which will provide a signal the polarity of which is indicative of the rotational direction of the shaft and the magnitude of which is indicative of the rotational speed of the shaft.

A known device for sensing the rotational direction of a shaft is a DC generator. Typically, a DC generator is coupled to the shaft and the polarity of the electrical signal generated by the DC generator as the shaft rotates is indicative of the direction of rotation of the shaft and the magnitude of the signal is proportional to the speed of rotation of the shaft. For example, if the shaft is rotated in one direction, the generator may establish a signal having a positive polarity and if the shaft is rotated in the opposite direction the generator may establish a signal having a negative polarity. DC generators, however, are relatively expensive and present maintenance problems due to the commutator and brushes which must be continually checked and replaced due to wear. Thus, not only is the initial investment of a DC generator considerable but the servicing and maintenance thereon is also expensive.

Accordingly, an object of the present invention is to provide a new and improved device for sensing the direction of rotation of a shaft which overcomes the hereinabove discussed disadvantages by utilizing an AC generator.

Another object of the present invention is to provide a new and improved device for sensing the direction of rotation of the shaft including a two-phase AC generator having a rotor attachable to the shaft and rotatable therewith, first and second spaced apart stator windings each of which is adapted to have a sinusoidal voltage established thereacross in response to rotation of the rotor with the shaft with the sinusoidal voltage established across one of the stator windings leading the sinusoidal voltage established across the other of the stator windings when the shaft rotates in one direction and the sinusoidal voltage established across the other stator winding leading the sinusoidal voltage established across the one stator winding when the shaft rotates in the opposite direction, and direction sensing means for determining which of the sinusoidal voltages is leading the other of the sinusoidal voltages to determine the direction of rotation of the shaft.

A still further object of the present invention is to provide a new and improved device for sensing the direction of rotation of the shaft as set forth in the next preceding paragraph wherein the magnitude of the sinusoidal voltages developed across the stator windings is a function of the rotational speed of the shaft and further including means for sensing the magnitude of one of the sinusoidal voltages established across one of the stator windings to determine the rotational speed of the shaft.

Still another object of the present invention is to provide a new and improved device for sensing the rotational direction of a shaft including an AC generator having a rotor which is coupled to the shaft and a pair of spaced apart stator windings, the AC generator being adapted to generate a voltage signal across each of the stator windings with the voltage signals being displaced relative to each other by an amount equal to the displacement of the stator windings, sensing means for sensing the relative displacement of the voltage signals and adapted to generate a digital output signal indicative of the relative position of the voltage signals, and means responsive to the digital output signal to provide a signal having a polarity which is a function of the direction of rotation of the shaft.

Another object of the present invention is to provide a new and improved device for sensing the rotational direction of a shaft as is recited in the next preceding paragraph wherein the voltages generated by the AC generator are sinusoidal and have an amplitude which is a function of the rotational velocity of the shaft and further including means for sensing the amplitude of one of the sinusoidal voltages for determining the rotational velocity of the shaft.

A still further object of the present invention is to provide a new and improved device for sensing the rotational direction of a shaft including an AC generator having a rotor which is coupled to the shaft and a pair of spaced apart stator windings which are displaced between 0 and 180 electrical degrees, the AC generator adapted to generate a sinusoidal voltage signal across each of the stator windings which has a magnitude which is a function of the rotational speed of the member, the sinusoidal voltage signals appearing across each of the stator windings being displaced relative to each other in an amount equal to the electrical displacement of the windings, comparator means for converting the sinusoidal signals to pulses of substantially constant amplitude and having a frequency equal to the frequency of the sinusoidal signals, sensing means including a logic circuit having a plurality of NAND gates arranged in a predetermined manner for sensing the relative position of the pulses and providing a digital signal indicative of the positions, and means responsive to the digital signal for providing an output signal having a polarity which is a function of the rotational direction of the shaft and having an amplitude which is a function of the rotational velocity of the member.

Further objects and advantages of the present invention will become apparent from the following detailed description of a preferred embodiment thereof taken in conjunction with the following drawings wherein:

FIG. 4 is a schematic illustration more fully illustrating the circuitry utilized in conjunction with the present invention; and FIG. 4a is a truth table for the NAND gates.

The present invention provides a device for sensing the rotational direction and the rotational speed of a shaft. The device includes an AC generator having a rotor fixed to the shaft and at least two stator windings which are displaced from each other and each of which have a sinusoidal voltage developed thereacross upon rotation of the rotor with the shaft. The sinusoidal voltages produces across the two stator windings have a phase displacement due to the displacement of the stator windings relative to each other. When the shaft is rotating in one direction, one of the sinusoidal voltages will lead the other and when the shaft is rotating in the opposite direction the other of the sinusoidal voltages will lead the one sinusoidal voltage. Comparator means are provided for converting the sinusoidal voltage signals to pulses having a substantially constant magnitude and a frequency equal to the frequency of the sinusoidal signals. The output of the comparator means is applied to a direction sensing logic circuitry which determines which of the pulses is leading the other of the pulses to thereby determine the direction of rotation of the shaft. The magnitude of the sinusoidal signals is indicative of the rotational speed of the shaft and means are provided for sensing the magnitude of one of the sinusoidal signals to determine the rotational speed of the shaft.

Figure 1:
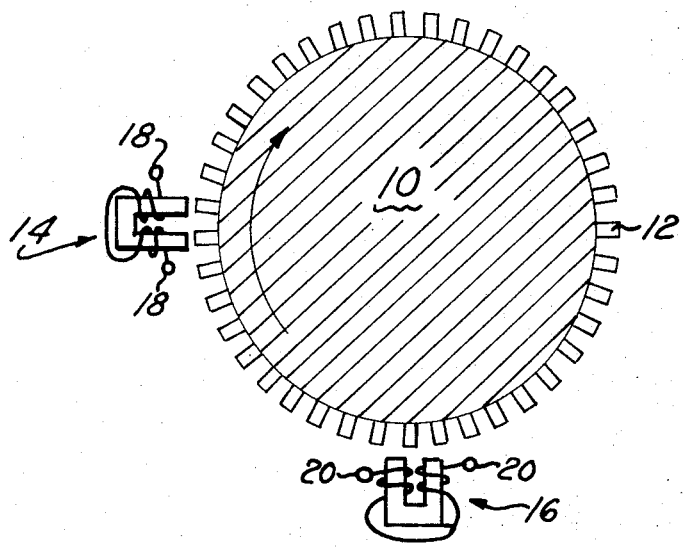
FIG. 1 is a schematic representation of a two-phase AC generator utilized in conjunction with the present invention.

A rotatable member which in the preferred embodiment is a shaft 10, illustrated in FIG. 1, has a rotor 12 attached thereto for rotation therewith. Disposed radially adjacent to the rotor 12 is a fixed stator winding 14 and a fixed stator winding 16. The stator windings 14 and 16 are each adapted to have a sinusoidal voltage developed thereacross when the rotor 12 rotates with the shaft 10. The sinusoidal voltage developed across the stator winding 14 will be applied across the leads 18 and the sinusoidal voltage developed across the stator 16 will be applied across the leads 20.

Figure 2:
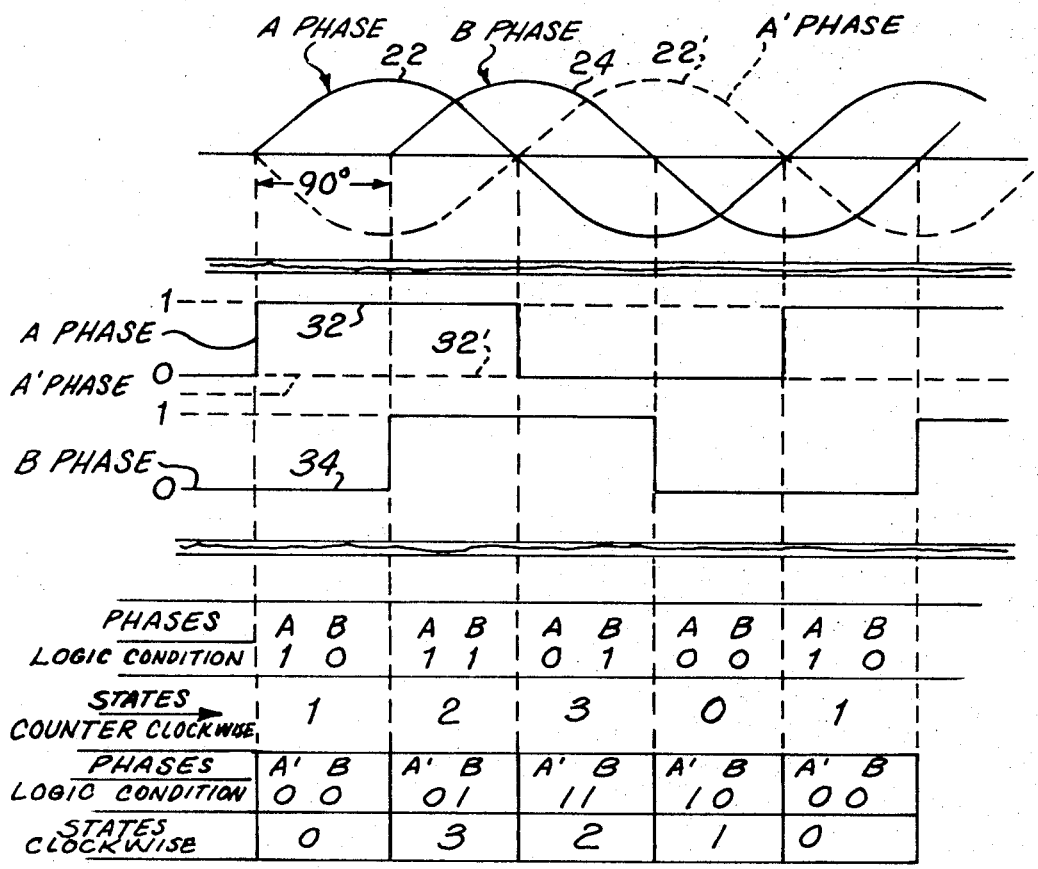
FIG. 2 is a graphical illustration of the voltages developed across the stator windings, the output of the comparator circuits, and the unique states formed by the output of the comparator circuits.

The stator windings 14 and 16 are spaced apart 90 electrical degrees so that the sinusoidal voltage developed across the stator winding 14 will be displaced 90° from the sinusoidal voltage developed across stator winding 16 as illustrated in FIG. 2. The sinusoidal wave form 22, which is established across the leads 18 of stator winding 14 and designated phase A in FIG. 2, leads the sinusoidal wave form 24, which is established across the leads 20 of stator winding 16 and designated phase B, by 90°. The sinusoidal wave forms 22 and 24 have been developed in response to the counterclockwise rotation of shaft 10. If shaft 10 were rotated in a clockwise direction, the sinusoidal wave form 22', illustrated in phantom lines in FIG. 2, would be established across stator winding 14 while the wave form 24 would be established across the stator winding 16. When the shaft 10 rotates in a counterclockwise direction, the wave form 22 will lead the wave form 24 by 90°, however, when the shaft 10 rotates in a clockwise direction the wave form 24 will lead the wave form 22' by 90°.

Figure 3:
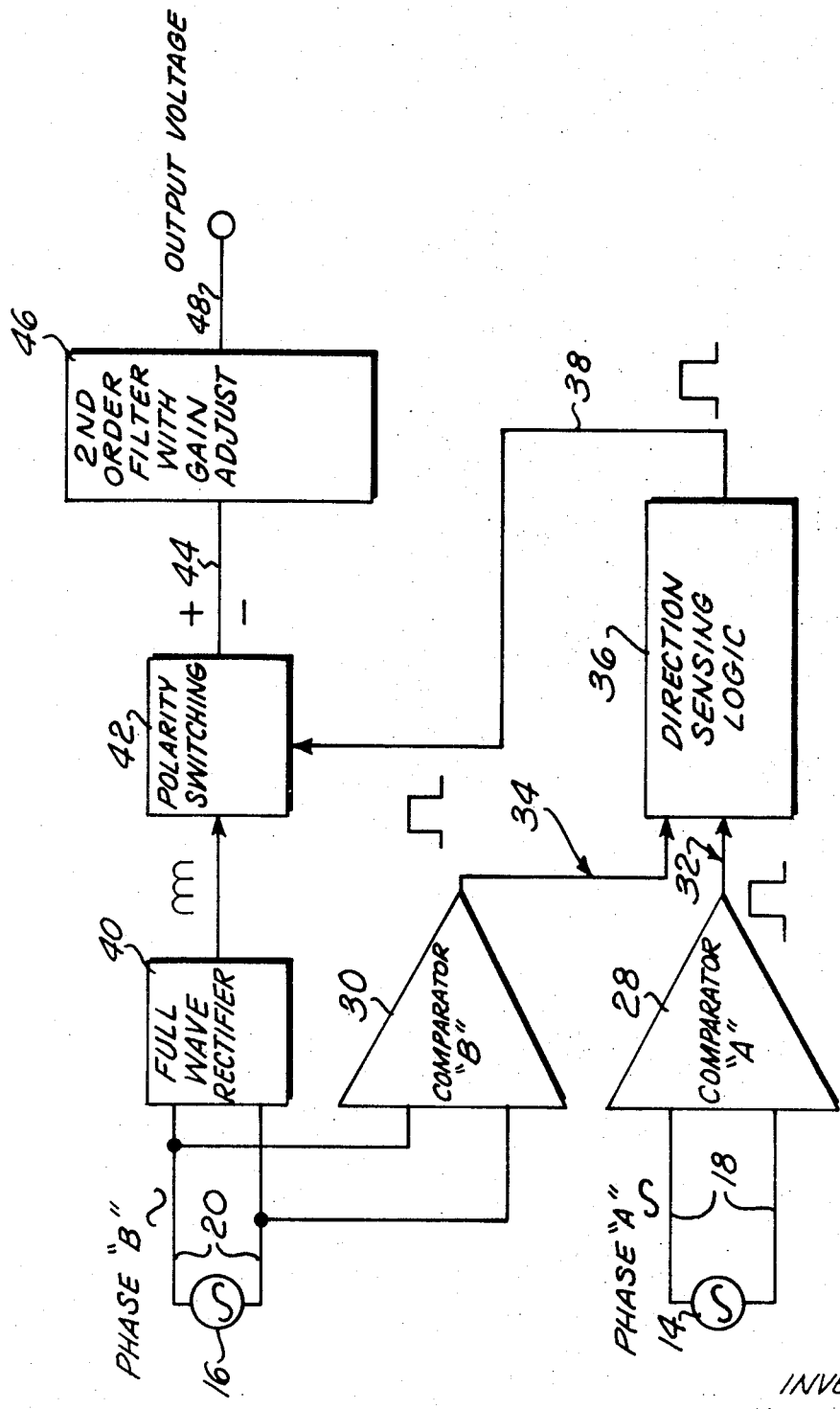
FIG. 3 is a schematic diagram of the circuitry associated with the present invention.

As is illustrated in FIG. 3 the sinusoidal voltage developed across stator winding 14 is directed by the leads 18 to a comparator 28 and the sinusoidal voltage developed across stator winding 16 is directed by the leads 20 to a comparator 30. The comparators 28 and 30 operate to convert the sinusoidal wave forms into a plurality of pulses having a substantially constant magnitude and a frequency equal to the frequency of the sinusoidal voltage applied to the respective comparator. The output pulses from each of the comparators 28 and 30 are in the form of a square wave, illustrated in FIG. 2, which may be defined as having "one" and "zero" logic conditions. When the square waves have a zero magnitude which corresponds to the negative value of sinusoidal voltage associated therewith, a "zero" logic condition will be defined and when the square waves have a one magnitude, that is, when the sinusoidal voltage associated therewith has a positive value, a "one" logic condition will be defined. The output of comparator 28 will be the square wave 32 which has a "one" logic condition when the sinusoidal wave form 22 has a positive value and a "zero" logic condition when the sinusoidal wave form 22 has a negative value. The output of comparator 30 will be the square wave 34 which has a "zero" logic condition when the sinusoidal wave form 24 has a negative value and a "one" logic condition when the sinusoidal wave form 24 has a positive value.

The combination of the logic conditions defined by the square waves 32 and 34 define a logic state. The output signals 32 and 34 of the comparators 28 and 30, respectively, have a plurality of unique logic states which form a predetermined progression, the direction of which is indicative of the direction of rotation of the shaft 10. The logic states are defined in FIG. 2 as states 1, 2, 3 and 0. In logic state 1 square wave 32 or the A phase has a "one" logic condition and wave form 34 or the B phase has a "zero" logic condition, in state 2 both phases have "one" logic condition, in state 3 phase A has a "zero" logic condition and phase B has a "one" logic condition and in state 0 both phases have a "zero" logic condition. The logic conditions of the wave forms 32 and 34 form the unique states and the progression of the states is indicative of the direction of rotation of the shaft 10. When the shaft 10 is rotating in a counterclockwise direction, the states will progress sequentially from 0 to 3 and when the shaft 10 is rotating in a clockwise direction, the states will progress sequentially from 3 to 0. The progression of the states from 0 to 3 is illustrated in FIG. 2 by the comparison of the outputs of the comparators 28 and 30 utilizing the A and B phases. The progressions of the states from 3 to 0 is illustrated in FIG. 2 by the comparisons of the outputs of the comparators 28 and 30 utilizing the A' and B phases which respectively correspond to the output 22' of the comparator 28 when the shaft 10 rotates in the clockwise direction and the output 24 of the comparator 30.

The outputs of the comparators 28 and 30 are applied to a direction sensing logic circuitry 36 which is operable to determine which of the sinusoidal wave forms is leading the other of the sinusoidal wave forms by sensing the progression of the states. The direction sensing logic circuit 36, more fully explained hereinbelow, is operable to direct a logic signal along line 38 indicative of the direction of rotation of the shaft 10.

The magnitude of the sinusoidal voltages produced across the stator windings 14 and 16 is directly dependent upon the speed of the rotation of the shaft 10. The sinusoidal voltage developed across the stator windings 16 is applied to a full wave rectifier 40 which rectifies the sinusoidal wave form to a pulsating DC voltage and directs it to a polarity switching circuit 42. The polarity switching circuit 42 is connected to the line 38 which has a logic signal thereon, which is indicative of the direction of rotation of the shaft 10. The signal on line 38 controls the polarity of the output signal established on line 44 from the polarity switching circuit 42. The output signal established on a line 44 from the polarity switching circuit 42 has a magnitude which is dependent upon the speed of rotation of the shaft 10 and a polarity which is indicative of the direction of rotation of the shaft. The output signal from the polarity switching circuit 42 is directed along the line 44 to a second order filter and gain circuit 46 which operates in a conventional manner to filter and invert the pulsating DC input signal and adjust the gain thereof. The output of the second order filter and gain circuit 46 is a DC voltage having a magnitude indicative of the speed of rotation of the shaft 10 and a polarity indicative of the direction of rotation of the shaft 10. The output of the second order filter and gain circuit 46 is directed along an output line 48 which may be connected to a suitable meter or other indicating device which will be operable to indicate both the direction and the speed of rotation of the shaft 10.

The full wave rectifier 40, more fully illustrated in FIG. 4 consists of diodes 50, 52, and the operational amplifier 60. The diode 50 operates to direct a positive input voltage from the stator winding 16 to the positive summing junction of the amplifier 60 through a voltage divider network consisting of resistors 62 and 64. The diode 52 operates to direct a negative input from the stator winding 16 voltage to the negative summing junction of amplifier 60 through a voltage divider network consisting of the resistors 66 and 68. The output of the operational amplifier 60 will be applied along a line 70 to the polarity switching circuit 42. The output of the operational amplifier 60 will be a positive pulsating DC voltage due to the application of the positive voltage to the positive summing junction and the negative voltage to the negative or inverting summing junction thereof. The magnitude of the output of the operational amplifier 60 will have an absolute value which is indicative of the magnitude of the sinusoidal voltages applied to the full wave rectifier 40 which is indicative of the speed of rotation of the shaft 10.

The comparator 30 includes an operational amplifier 72 having its positive input connected via a line 74 to the stator winding 16. The AC wave form from the stator winding 16 is directed along the line 74 through the resistors 76 and 78 to the positive summing junction of the operational amplifier 72. The amplifier 72 converts the sinusoidal AC input signals to logic levels at the 0 crossing of the AC wave form and directs the logic levels, the square wave 34, to the direction sensing and logic circuitry 36 via a line 80. The comparator 28 operates in the manner analogous to the comparator 30 and the AC sinusoidal input is directed from the stator winding 14 through a resistor 82 to the positive input of an operational amplifier 84 which converts the AC sinusoidal input to logic levels at the 0 crossing of the AC wave form. The output of operational amplifier 84, the square wave 32, will be directed along the line 86 to the input of the direction sensing and logic circuitry 36. The outputs of the operational amplifiers 72 and 84 will have a "one" logic level when the sinusoidal voltage associated therewith is positive and a "zero" logic level when the sinusoidal voltage associated therewith is negative as is illustrated in FIG. 2. Zener diodes 73 and 75 are respectively associated with amplifiers 72 and 84 and act to clamp the output of the amplifiers. If it is desired the A phase may be shifted 180° or inverted by connecting the input from the stator winding 14 to the negative input of the amplifier 84. This allows phasing which of the stator windings will lead the other of the stator windings by merely choosing which input of the amplifier 84 the input from the stator winding 14 is directed to.

The logic outputs of the comparator circuits 28 and 30 will be applied to the direction sensing and logic circuitry 36 which includes the NAND gates 90-112. The NAND gates 90-112 each have a unique state when two high inputs are applied thereto as is shown in the truth table illustrated in FIG. 4a. If both of the inputs to the NAND gates are high, the output will be low and the unique state will be defined. Any other combination of high or low inputs to the NAND gates will cause the output of the NAND gates to be high.

The output line 80 from the comparator circuit 30 is directed to the inputs of the NAND gate 90 and to one of the inputs of the NAND gate 98. The output from the comparator circuit 28 is directed along the line 86 to the inputs of the NAND gate 92 and to one of the inputs of the NAND gate 94. The NAND gates 94, 96 and 98 will be operable to define state 1, state 0 and state 3, respectively, when the output of the respective NAND gate is low or in its unique state. Thus, when the output of NAND gate 94 is low, the comparator circuits 28 and 30 will be sensing state 1, when the output of NAND gate 96 is low the comparator circuits will be sensing state 0 and when the output of NAND gate 98 is low the comparator circuits 28 and 30 will be sensing state 3.

The output of the NAND gates 94 and 96 are directed respectively to the inputs of NAND gates 100 and 102 which form a flip-flop 114. The flip-flop 114 will operate to store at its output a signal indicative of the last input state 1 or 0 which was directed thereto by the NAND gate 94 or 96 respectively. The state of the flip-flop 114 will be dependent upon the state sensed by the NAND gates 94 and 96 which will set and reset flip-flop 114. If NAND gate 94 last has a low output then flip-flop 114 will store at its output a signal indicative of state 1. If NAND gate 96 last has a low output then flip-flop 114 will store at its output a signal indicative of state 0.

The output of the flip-flop 114 will be directed to the input of a gated flip-flop 116, which is composed of NAND gates 106, 108, 110 and 112. The output of the flip-flop 114 may be entered into flip-flop 116 only when flip-flop 116 is gated. Flip-flop 116 will be gated when the NAND gate 98 senses its unique state and has a low output which is indicative of the occurrence of state 3. The output of the NAND gate 98 is directed to a single shot multivibrator which is operable to gate the flip-flop 116. The single shot multivibrator includes the NAND gate 104, resistor 118, capacitor 120, diode 122, and resistor 124. The single shot multivibrator will be activated when the output of NAND gate 98 is low and indicative of the occurrence of state 3 to limit the length of the strobe pulse from the NAND gate 98 to avoid logic changing conditions at the end of state 3.

The operation of the logic circuitry 36 enables the NAND gates 94, 96 and 98 to respectively sense states 1, 0 and 3. The last occurring state of the states 1 and 0 will be stored in the flip-flop 114. Upon the occurrence of state 3, flip-flop 116 will be gated by the output of the NAND gate 98 which will fire the single shot multivibrator and enable the output of flip-flop 114, which is indicative of the last occurring state 1 or 0, to be directed to the input of flip-flop 116. The flip-flop 116 will then sense the input from the flip-flop 114 to determine whether state 1 or state 0 occurred last before the occurrence of state 3. If state 1 occurred after state 0 before state 3, then it can be determined that the progression of the states is 0, 1, 2, 3 and if state 0 occurred after state 1 before state 3 then it can be determined that the progression of the states is 3, 2, 1, 0. If the progression of the states is 0, 1, 2, 3, then it can be determined that the shaft 10 is rotating in a counterclockwise direction and if the progression of the state is 3, 2, 1, 0, then it can be determined that the rotation of the shaft is in a clockwise direction. The output of flip-flop 116 has a low or "zero" logic level if the progression of the states is 0, 1, 2, 3 and the shaft 10 is rotating in a counterclockwise direction and a high or "one" logic level if the progression of the states is 3, 2, 1, 0 and the shaft 10 is rotating in a clockwise direction.

The output of the flip-flop 116 will be applied along the line 38 through a resistor 130 to the base of a transistor 132. The collector of transistor 132 is connected to the positive input of an amplifier 134 which forms part of the polarity switching circuit 42. The polarity switching circuit 42 takes the output of the operational amplifier 60 which has a magnitude indicative of the speed of rotation of the shaft 10, and fixes the polarity of the signal to indicate the direction of rotation of the shaft. The output of the operational amplifier 134 may or may not be inverted, depending on whether transistor 132 is in its conductive or nonconductive state. If transistor 132 is conductive, caused by a high or "one" logic signal on line 38 from the direction sensing and logic circuitry 36, the input signal to amplifier 134 will be applied only to the negative summing junction thereof. When the input is only applied to the negative summing junction of amplifier 134 the amplifier 134 will have a gain of minus one or unity gain inverting to thereby invert the positive output signal from amplifier 60. If transistor 132 is off caused by a zero or low signal appearing on line 38 then the input to operational amplifier 134 from the output of operational amplifier 60 will be applied to both the positive and negative summing junctions of the operational amplifier 134. The resistors 140 and 142 have a value to provide a gain of plus two to the positive summing junction of the operational amplifier 134 due to the ratio of the resistance of resistor 144 to the series combination of the value of the resistors 140 and 142. Thus, when transistor 132 is nonconducting the gain of amplifier 134 will be plus 1 since inputs are applied to the negative summing junction having a net gain of minus 1 and the positive summing junction having a net gain of plus 2. Accordingly, the output of the operational amplifier 134 when transistor 132 is off has a net gain of plus 1 and is non-inverting. Thus, switching of transistor 132 on and off by the output signals from the direction sensing logic circuitry 36 controls the gain of the amplifier 134 from a plus 1 to a minus 1 to thereby control the output of the operational amplifier 134 directed along the line 44 to the second order gain and filter network 46. It should be appreciated that if the shaft 10 is rotating in a counterclockwise direction, transistor 132 will be nonconductive and the output of amplifier 134 will have a positive polarity and if the shaft 10 is rotating in a clockwise direction, transistor 132 will be conductive and the output of amplifier 134 will have a negative polarity due to the inverting effect of the amplifier 134.

The second order gain and filter network 46 includes an operational amplifier 150 having the output along the line 44 from the polarity switching circuit connected to the negative summing junction thereof. The amplifier 150 along with its associated resistors and capacitors operates to filter ripple out of the DC voltage applied thereto and invert the signal from the polarity switching circuit 42. Thus, if the shaft 10 is rotating in a clockwise direction the output of the amplifier 150 will be positive and if the shaft 10 is rotating in a counterclockwise direction the output of the amplifier 150 will be negative. A potentiometer 152 is connected to the output of the amplifier 150 and is adjustable to control the gain of the second order filter network 46 so as to adjust the level of the DC output signal. It should be apparent that the operational amplifier 150 is operable to apply an output signal to the line 154 which has a magnitude indicative of the speed of rotation of the shaft 10 and a polarity indicative of the direction of rotation of the shaft 10.

From the foregoing it should be apparent that a new and improved device for sensing the rotation of a shaft has been provided. The device includes an AC generator having two spaced apart stator windings which are operable to produce sinusoidal wave forms which are displaced relative to each other in accordance with the direction of rotation of the shaft. A pair of comparator circuits are provided for converting the wave forms to pulses having a frequency equal to the frequency of the sinusoidal wave form and a substantially constant magnitude. A direction sensing logic circuitry is provided for sensing the outputs of the comparators to determine the direction of rotation of the shaft. A full wave rectifier is connected to one of the stator windings and provides a signal having a magnitude which is indicative of the speed of rotation of the shaft. The signal from the full wave rectifier is applied to a polarity switching circuit which controls the polarity in accordance with the output of the direction sensing logic circuitry to provide an output signal which has a polarity indicative of the direction of rotation of the shaft and a magnitude indicative of the speed of rotation of the shaft. The output signal from the polarity switching circuit is directed through a second order filter with a gain adjustment to filter out the ripple signal and adjust the gain and control the level of the output signal.

What I claim is:

1. Apparatus for sensing the direction of rotation of a shaft comprising a two-phase AC generator having a rotor attachable to the shaft and rotatable therewith, a first stator winding and a second stator winding spaced from said first stator winding, said first stator winding adapted to have a first sinusoidal voltage established thereacross in response to rotation of said rotor with the shaft and said second stator winding adapted to have a second sinusoidal voltage established thereacross in response to rotation of said rotor with the shaft, said first sinusoidal voltage established across said first stator winding leading said second sinusoidal voltage established across said second stator winding when the shaft rotates in a first direction, said second sinusoidal voltage established across said second stator winding leading said first sinusoidal voltage established across said first stator winding when the shaft rotates in a second direction opposite said first direction, means for comparing said first and second sinusoidal voltages to produce a first series of distinct logic conditions when said shaft rotates in one direction and a second series of distinct logic conditions when such shaft rotates in the opposite direction, and direction sensing means for determining the progression of the series produced by said comparing means to determine the direction of rotation of said shaft.

2. Apparatus for sensing the rotation of a shaft as defined in claim 1 wherein the magnitude of at least said first sinusoidal voltage is a function of the rotational speed of the shaft and means for sensing the magnitude of at least said first sinusoidal voltage to determine the rotational speed of the shaft.

3. Apparatus for sensing the rotation of a shaft as defined in claim 1 wherein said comparing means includes first comparator means for converting said first sinusoidal voltage to a first digital output signal and second comparator means for converting said second sinusoidal voltage to a second digital output signal.

4. Apparatus for sensing the rotation of a shaft as defined in claim 3 wherein said direction sensing means is connected to the outputs of said first and second comparator means for determining which of said first and second digital output signals leads the other of said first and second digital output signals and establishing a direction sensing output signal the polarity of which is indicative of the direction of rotation of the shaft.

5. Apparatus for sensing the rotation of a shaft as defined in claim 3 wherein the combination of said first and second digital output signals have at least first, second and third unique states which form said series, the progression of said states in the series being indicative of the direction of rotation of the shaft.

6. Apparatus for sensing the rotation of a shaft as defined in claim 5 wherein said direction sensing means includes a first flip-flop for sensing said first and second states, said first flip-flop having a set state when actuated by one of said first and second states and a reset state when actuated by the other of said first and second states and means for sensing the state of said first flip-flop upon the occurrence of said third state for determining which of said first and second states next preceded said third state to thereby determine the progression of states and the direction of rotation of the shaft.

7. Apparatus for sensing the rotation of a shaft as defined in claim 6 wherein said means for sensing the state of said first flip-flop at said third state establishes a direction sensing output signal having a first polarity when said first state precedes said second state in said progression of states and the shaft is rotating in said first direction and establishes a direction sensing output signal having a second polarity opposite said first polarity when said second state precedes said first state in said progression of states and the shaft is rotating in said second direction.

8. Apparatus for sensing the rotation of a shaft as defined in claim 6 wherein the magnitude of said first sinusoidal voltage is proportional to the rotational speed of the shaft and further including means for sensing the magnitude of said first sinusoidal voltage to determine the speed of rotation of said shaft.

9. Apparatus for sensing the rotation of a shaft as defined in claim 8 wherein said means for sensing the magnitude of said first sinusoidal voltage establishes an output signal the magnitude of which is a function of the rotational speed of the shaft and said means for sensing the state of said first flip-flop is operable to change the polarity of said output signal of said means for sensing the magnitude of said first sinusoidal voltage as a function of the direction of rotation of the shaft to enable said output signal to have a magnitude indicative of the rotational speed of the shaft and a polarity indicative of the direction of rotation of the shaft.

10. A device for sensing the rotational direction of a rotatable member comprising an AC generator having a rotor which is coupled to the rotatable member and two stator windings which are displaced between 0 and 180 electrical degrees, said AC generator adapted to generate a pair of voltage signals when said member is rotating, said voltages appearing across the stator windings and being displaced relative to each other in phase an amount equal to the electrical displacement of said windings, sensing means for sensing the relative position of the voltage signals, said sensing means being adapted to generate a series of distinct digital output signals the progression of which is indicative of the relative position of said voltage signals, means responsive to the progression of said series of digital output signals to provide a signal having a polarity which is a function of the rotational direction of said member.

11. The device in claim 10 wherein the voltages generated by said AC generator are substantially sinusoidal and have an amplitude which is a function of the rotational velocity of said member.

12. The device in claim 11 wherein said sensing means includes means for converting said sinusoidal voltages to pulses having a frequency equal to the frequency of said sinusoidal voltages and a substantially constant amplitude.

13. The device in claim 10 wherein said means responsive to said series digital output signals includes an operational amplifier which provides an output signal having an amplitude which is a function of the velocity of the rotating member and a polarity which is a function of the rotational direction of said member.

14. A device for sensing the rotational direction of a rotatable member comprising an AC generator having a rotor which is coupled to the rotatable member and two stator windings which are displaced between 0 and 180 electrical degrees said generator adapted to generate a pair of voltage signals which are substantially sinusoidal and have a magnitude which is a function of the rotational speed of said member, one of said voltage signals appearing across each of said windings and being displaced relative to each other in phase an amount equal to the electrical displacement of said windings, means for converting said sinusoidal signals to pulses of substantially constant amplitude having a frequency equal to the frequency of the sinusoidal signals, sensing means for sensing the relative position of the pulses and generating a first and second series of distinct output signals indicative of the relative position of said pulses and, means responsive to said series of output signals to provide a signal having a polarity which is a function of the rotational direction of said member and having an amplitude which is a function of the rotational velocity of said member.

15. The device in claim 14 wherein said means for converting said sinusoidal signals comprises a comparator.

16. The device in claim 14 wherein said sensing means comprises a logic circuit which includes a plurality of NAND gates arranged in a predetermined manner to provide a digital signal indicative of whether the first or second series of output signals is applied thereto.

17. A device in claim 14 wherein said means responsive to said digital signals includes an operational amplifier having positive and negative input terminals and wherein the absolute gain of the positive input terminal is greater than the absolute gain of the negative input terminal.

18. A device for sensing the rotational direction of a rotatable member comprising an AC generator having a rotor which is coupled to the rotatable member and two stator windings which are displaced between 0 and 180 electrical degrees, said generator adapted to generate a pair of voltage signals which are substantially sinusoidal and have a magnitude which is a function of the rotational speed of said member, one of said voltage signals appearing across each of said windings and being displaced in phase relative to each other an amount equal to the electrical displacement of said windings, means comprising a comparator for converting said sinusoidal signals to pulses of substantially constant amplitude and having a frequency equal to the frequency of the sinusoidal signals, sensing means comprising a logic circuit which includes a plurality of NAND gates arranged in a predetermined manner, said sensing means adapted to sense the relative position of said pulses and to provide a series of distinct digital signals indicative of said positions, and means responsive to said series of digital signals and adapted to provide a signal having a polarity which is a function of the rotational direction of said member and having an amplitude which is a function of the rotational velocity of said member.

19. A device in claim 18 wherein said means responsive to said digital signals includes an operational amplifier having positive and negative input terminals and wherein the absolute gain of the positive input terminal is at least twice the absolute gain of the negative input terminal.

* * * * *